Patented May 21, 1929.

1,713,846

UNITED STATES PATENT OFFICE.

ROBERT A. MARR, OF NORFOLK, VIRGINIA.

LEATHER SUBSTITUTE AND PROCESS OF MAKING.

No Drawing.     Application filed January 12, 1924. Serial No. 685,896.

The present invention relates to the production of leathery materials, suitable for use for many purposes as substitutes for leather, which shall be of a degree of flexibility resembling that of thick or thin leather, of ordinary high grade, and which shall have a strength comparable with that of real leather, which shall be more or less waterproof, and which can easily be prepared, so as to successfully compete, in point of price, with real leather, for many of the uses of the latter.

The object is not so much to produce a product which shall have all of the outward appearances of ordinary leather, as to produce a product which will have the useful physical properties of leather, particularly strength and flexibility, which can accordingly be substituted for leather, in the manufacture of various final products or articles.

The base of the leather substitute of the present case, is wood fiber, preferably that made from hard wood, in accordance with the processes described in my copending applications, Serial No. 407,759, filed September 2, 1920, No. 595,215 filed October 17, 1922, No. 616,609 filed Feb. 2, 1923 and No. 616,610 filed Feb. 2, 1923.

The woods used may be and preferably are the hard woods, such as hickory, nut-tree woods, birches, oaks, and bamboos and canes such as *Machrosperma arendaria* and *Machrosperma tecta*. These woods are given merely as examples of suitable woods, without in any way intending to restrict the invention thereto. Mixtures of two or more of such woody materials can be used also and in many cases give rather better results than any one material alone.

For preparing the digested woods, any one or more of the above mentioned woods, or a mixture of several of these woods, is digested in a solution, preferably a sulfate solution, in accordance with the processes of the applications above referred to, and in general this digestion may include treatment under a pressure of from about 80 to 120 pounds, and at a temperature corresponding to these pressures, for about an hour (or say from 60 minutes to 100 minutes, more or less) in the ordinary pulp digester which may be made of cast iron. The digestive solution to be used, may, as in my copending cases above referred to, or in my prior Patent 1,166,848, consist of solutions of sulfates, such as those of sodium, potassium, magnesium, aluminum, copper, zinc, iron and the like, or mixtures of such solutions. With woods like bamboo, canes etc., which contain considerable amounts of silica, it is advisable to employ mixtures containing some potassium sulfate. A solution containing 2 parts of zinc sulfate, 1 part of potassium sulfate and 2 parts of sodium sulfate gives vesy satisfactory results. This mixture can be dissolved in water in the amount of 1 to 4 ounces (preferably 1½ to 3 ounces) per gallon of water, to form the digestive solution. Also a solution of kainite of about the same strength (say 2.5 oz. per gallon) is very satisfactory. These two solutions are mentioned as being applicable to all kinds of wood as described herein.

For making leather substitutes, mixtures of cane or bamboo with one or more hard woods, or mixtures of cane or bamboo with a hard wood and a soft wood, or mixtures of two or more hard woods, with or without a soft wood, all are found to give very satisfactory results. Soft woods alone are generally less satisfactory. After which the liquor is drawn off, and the digested wood removed from the digester and first soaked in water for a time in order to wash off the adhering digesting solution, and to thoroughly soak the digested wood. When the wood has been digested in the form of chips of about the size commonly used in making pulp, the chips can be blown from the digester into a tank of water, and allowed to soak for a while. Usually it is preferable to use the wood in much larger pieces, say up to 30 cubic inches. The digested material, after soaking can be run through a pulper or similar machine such as edge runner, and the material is then run into a beating engine, and is brush beaten (with water in the usual proportion) preferably at a high speed for several hours. It is advisable to combine the beating with a washing operation, in order to wash out more or less of the disintegrated intercellular cementitious material which binds the fibers together. During this beating operation the beater roll is, at the beginning of the operation raised up considerably above the bed, for instance the roll may be at the beginning of the operation, about 7 turns up from the bed, and the material is beaten under this condition, for say an hour, the speed of the material through the beater may vary a good deal, but I prefer a speed of about 1000 or 1200 feet per minute.

During the beating operation the roll can be gradually lowered, say from 7 turns up down to about 1 or 1½ turns up, and the entire beating operation may occupy about 2 hours. If beaten at a slower speed, the time of beating can be correspondingly increased.

The amount of disintegrated intercellular cementitious matter to be removed from the pulp during the beating operation, will depend to a considerable extent upon the specific wood, or mixture of woods under treatment. However, for most of the above varieties of wood, I find that the removal of about 7½% (or say 5 to 10%) of the total amount of the wood content, (which may be 45 to 90% of the actual intercellular cementitious matter) gives very satisfactory results.

During the latter part of the beating operation, or at any other suitable stage, I add a suitable sizing material such as rosin size and alum or other aluminum salts, the proportion of which will depend on the character of the leather substitute to be produced. A small proportion of latex improves the quality in most cases, this being preferably added at the time of adding the rosin size. Thus the rosin can be dissolved in soda solution, then somewhat diluted, and the latex added thereto, say one part of latex to two or three parts of the rosin used in making the size. Instead of latex, or in addition thereto, emulsions of heavy oils, asphaltic oils, asphalt etc., can be used.

Any desired dye can also be added at this stage. If a thin leather substitute such as is desired for making automobile tops, covers for automobile seats and the like (and of a thickness corresponding to that of shoe uppers) is desired, ½% to 2% or so of rosin size is used, while if a heavy leather substitute, suitable for sole leather and about the thickness of ordinary sole leather is being made, about 3% of rosin size can be used. In both cases after adding the rosin size, the alum is added and the latter is preferably somewhat in excess over the amount of rosin used.

A feature of importance in the present case is the waterproofing of the product. This can most readily be accomplished by the use of an emulsified rubbery material, for which purpose I find ordinary latex to be a very suitable material.

The latex for water-proofing can be added in the beater, toward the end of the beating operation (say with the rosin size if desired) or can be added (although less advantageously) after the material has been removed from the beater and after the separation of the bulk of the water. However, a sufficient amount of water is preferably present in the pulp in the latter case, to maintain a fluid mass. If the latex is added in the beater, it may be added to the entire mass of liquid pulp, or after a considerable amount of the water has been drained off. About 1 to 2% or so of latex is a suitable quantity and after adding this material the pulp may be again beaten for, say, 10 or 15 minutes, in order to fully mix the same with the pulp. The water is then drained off, and this water will be found to carry more or less of the latex in suspension, which can be suitably recovered, or this water can be added to the next batch of pulp, for instance after a considerable proportion of the cementitious matter has been removed from the pulp in the beater. The latex also can be added after the pulp has been separated from a large proportion of the water, after leaving the beater, and the mass again well mixed. In another modification the sheets after the same have been formed, and after the bulk of the water therein has been removed by suction, can be passed through the latex diluted with water. This latter method, however, does not give always, such a complete mixing of the fine rubber particles with the pulp.

The pulp, preferably after sizing and water-proofing, is then run out into a sheet of the desired thickness, which operation can be readily performed on a paper machine or on a pulp strainer provided with a slight jarring motion to felt the fibers together to better advantage.

The pulp may be formed into a sheet on a fabric to which it will adhere, if desired, but this is by no means necessary, and very satisfactory products can be made without the fabric backing.

In a modified form of execution of the water-proofing process, the sheets are formed from the pulp, after sizing, by the steps above described. The sheet can then be run (rather slowly by preference) through a bath of a diluted latex, say one volume of the latex to three to ten volumes of water. The sheet is then dried.

The sheeted product after any treatment with latex, can be subjected to a vulcanizing treatment if desired.

Example 1. Say equal parts of (a) bamboo (b) chestnut or oak and (c) Sitka spruce or Maine spruce (which can be in the form of chips or the bamboo in the form of pieces a foot long, and the other woods in the form of blocks an inch thick by three or four inches wide and a foot long, are digested in a solution of Epsom salt and sodium sulfate (say ¾ to 1¼ ounces of each per gallon) under a steam pressure of 90 to 100 lbs. and at a corresponding temperature, for 75 to 120 minutes (in addition to the time of bringing the temperature and pressure up to that stated). The woody material is soaked over night in water (which can be at ordinary temperature). The digested material is crushed in an edge runner mill, run through a pulper, beaten and washed as above described, and 1.5% of rosin size added, the beating continued for another 10 to 20 minutes, another sizing material added containing say .5% rosin size and .25 to 1% of rubber latex added and again beaten for 10 minutes or so. The aluminum sulfate or alum is added in slight excess, to precipitate the rosin size, which also will be found to precipitate the bulk of the rubber in small particles which will readily attach themselves to the fiber while continuing the beating for another 20 minutes or so. The pulp is then sheeted as above.

The processes of cooking woody material in the digestive solutions described herein, are not claimed in the present application, but in my copending cases above referred to.

I claim:

1. A process of making a leathery product which comprises pulping material containing digested wood, brush-beating the pulped material at a speed not substantially below 1000 feet per minute, adding a sizing material, removing a portion of the disintegrated binding matter and sheeting the product.

2. A process of making a leathery product which comprises pulping material containing digested wood, brush-beating the pulped material at a speed not substantially below 1000 feet per minute, adding a sizing material, removing a portion of the disintegrated binding matter and sheeting the product, and incorporating emulsified rubbery material with the product at any stage of the process.

3. A process as specified in claim 2, in which the emulsified rubbery material is "latex."

4. A process as covered in claim 1, in which the wood is previously digested in a sulfate solution of about 1 to 4% strength.

5. A leathery material comprising a pulped hard wood together with precipitated latex disseminated therethrough.

In testimony whereof I affix my signature.

ROBERT A. MARR.